March 30, 1965  E. W. TACONIS  3,175,801
FLUID FLOW CONTROL DEVICE
Filed Feb. 26, 1963  2 Sheets-Sheet 2
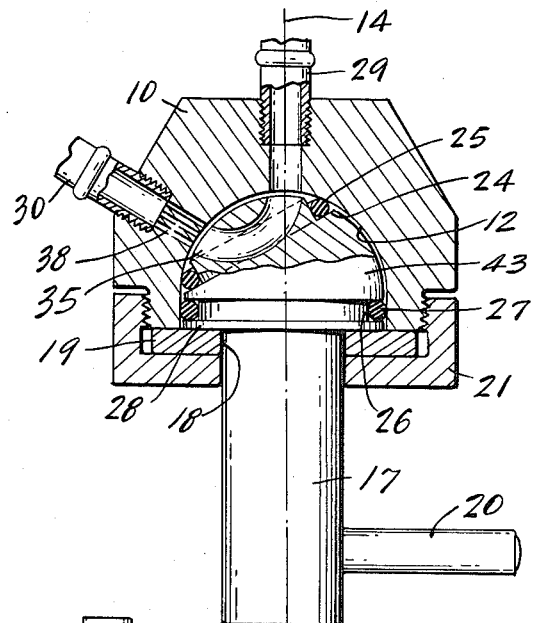
FIG-3-
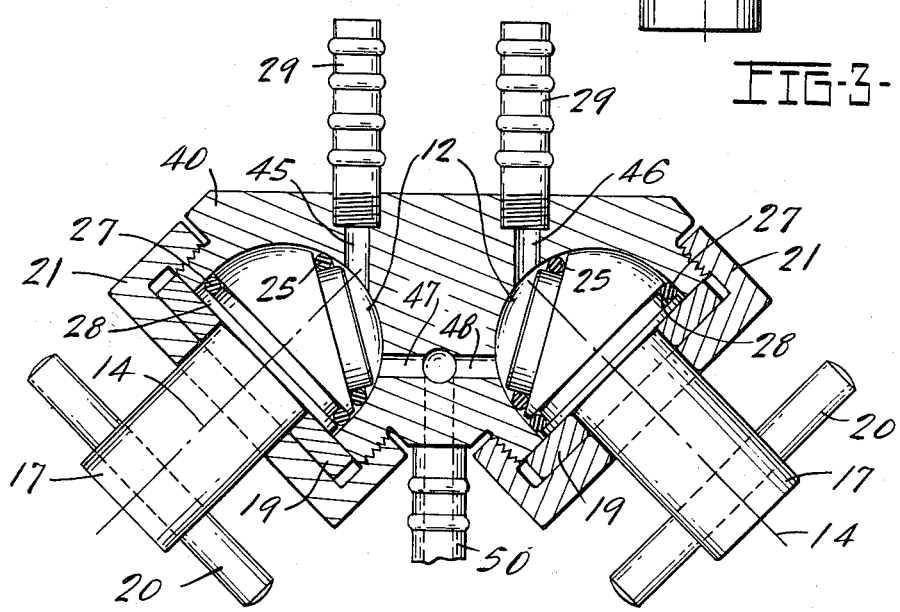
FIG-4-
INVENTOR.
EELKE W. TACONIS
BY
Hugh A Kirk
ATT'Y.

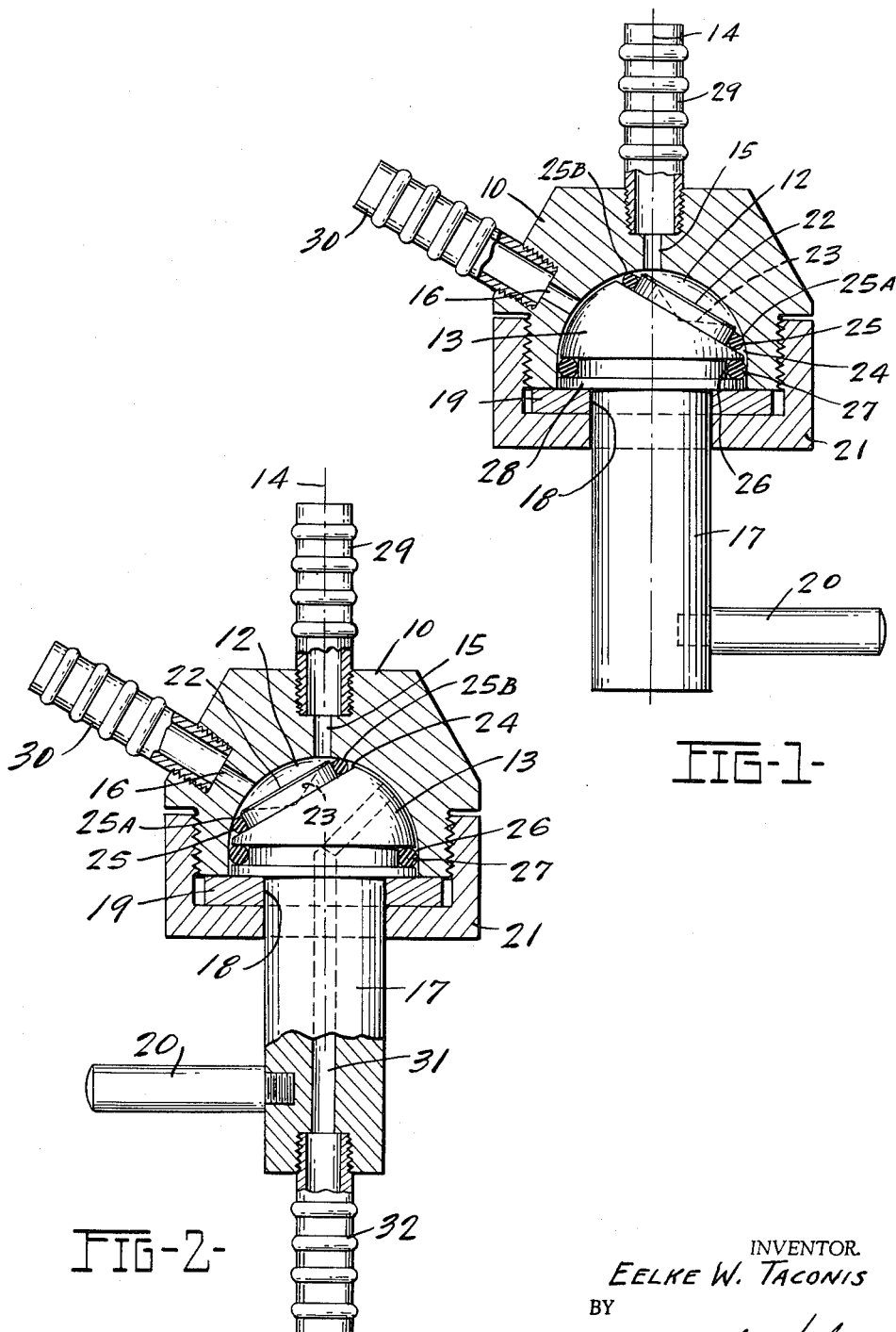

United States Patent Office 3,175,801
Patented Mar. 30, 1965

3,175,801
FLUID FLOW CONTROL DEVICE
Eelke Wijbren Taconis, Delft, Netherlands, assignor to Stichting Waterbouwkundig Laboratorium, Delft, Netherlands, a corporation of the Netherlands
Filed Feb. 26, 1963, Ser. No. 261,033
Claims priority, application Netherlands, Feb. 27, 1962, 275,327
17 Claims. (Cl. 251—309)

This invention relates to a fluid flow control device. More particularly, it deals with a valve comprising a semi-spherical plug rotated in a semi-spherical cavity having at least two conduits opening into said cavity, and a passageway in said plug able to connect said conduits but being positioned eccentric to the axis of rotation of said plug.

There is known a fluid flow control device shown in British Patent No. 824,649 having a cavity as well as the plugs which are substantially completely spherical, which device demands precision finishing, while the repairing operation, if possible at all, require the complete removal of the control device from the conduit system. In addition to this, the packing about the stem of the spherical plug should be of exceptionally good quality, because this packing, in contrast to that of a conical plug, forms the only centering means and can, therefore, be subjected to heavy strains during severe usage.

The object of the invention is to construct a fluid flow control device which overcomes the drawbacks mentioned, namely to provide such a device which is easily disassembled while remaining connected to its fluid ducts, and which has a reduced wear on its packing seals.

Another object is to provide a double seal in the valve between the ducts and the atmosphere.

Accordingly to achieve these objects, the control device or valve according to this invention comprises at most a semi-spherical cavity with a semi-spherical plug rotatable therein, with one packing ring provided on the semi-spherical plug whose plane intersects the center line of the semi-sphere inside the semi-sphere, while all conduit apertures into the cavity are located within the largest circle which any part of said packing ring can describe, and one conduit aperture is located within the smallest circle which any part of the said packing ring can describe. In addition it is preferred that a second packing ring be provided on the plug, near its largest circumference. The plug may also include a drain duct for one of the conduits, and the device may be made in pairs or multiple, such as in a mixing spigot for a wash basin.

The above mentioned and other features and objects of this invention and the manner of attaining them will become more apparent and the invention itself will be understood best by reference to the following description of embodiments of the invention taken in conjunction with the accompanying drawings, wherein:

FIG. 1 is a vertical sectional view of one embodiment of a flow control device or valve according to the invention, showing the plug in closed position;

FIG. 2 is a view similar to FIG. 1 of a slightly modified form of the invention and showing the plug in opened position;

FIG. 3 is a view similar to FIG. 1 showing another embodiment of the invention with the plug in opened position; and FIG. 4 is a vertical sectional view of a mixing valve in which the invention has been incorporated.

A casing which may be the body of the fluid flow control device or valve is shown at 10 and a cavity 12 is provided in the casing 10, the cavity wall being semi-spherically curved. In this cavity 12 a plug 13 is rotatable about its center line 14. A duct or conduit 15 opens into the cavity 12 substantially concentrically with respect to the center line 14, while a second duct or conduit 16 opens into the cavity 12 eccentrically with respect to the center line 14 and may be slightly countersunk to remove any sharp edge.

The semi-spherical plug 13 has a stem 17, which extends through an opening 18 in a disc 19 and which stem 17 carries a handle such as an arm 20, with which the plug 13 can be rotated. The disc 19 is secured to the casing 10 by a cap screw 21.

The otherwise semi-spherical plug 13 is provided with a flat at 22, so that free space is created in the cavity 12, which space can function as a passageway for the fluid between the conduits 15 and 16. As indicated by the dotted line, the flat 22 can also be provided with a conical or other depression 23 in order to obtain a better passage of fluid flow with less resistance.

A groove 24 has been turned into the plug 13 round about the passageway or flat 22, the cross-section of said groove being a triangle, the groove being circular but situated eccentrically to the center line 14. Into this groove 24 fits a packing element such as an O-ring or other gasket 25 which takes care of the sealing between the plug 13 and the cavity 12. The tangent circle of the O-ring 25 with the cavity 12 is situated in a separating plane, which intersects the center line 14 inside the plug 13 at an acute angle. The apertures of the two conduits 15 and 16 are situated inside the largest circle which can be described by any part of this tangent circle. This largest circle is described by the point 25A of the O-ring 25 (to the right in FIG. 1). The aperture of the conduit 15 on the other hand is, in addition to this, situated within the smallest circle which can be described by any part of the tangent circle of the O-ring and this smallest circle is described by the highest positioned point 25B of the O-ring (to the left in FIG. 1).

Adjacent the bottom of plug 13, another and rectangular groove 26 is turned into the plug 13 in which groove is situated another gasket or O-ring 27 having a tangent circle to the cavity substantially in a plane through the sphere center. The O-ring 27 may be separated from the disc 19 by a bearing ring 28, so as to make it possible for it to lie against the spherical wall of the cavity 12 and against the plug 13. The bearing ring 28 can be fastened to the plug but can also lie loosely about the stem 17.

If the conduit 15 is connected to a system of conduits by means of a hose connector 29 screwed into it, as shown in FIG. 2, or in some other known way, this control device is provided with a double sealing about the plug against the atmosphere. Hereby leakage is practically excluded and consequentially so is fluid loss. This holds good for the closed positions as shown in FIG. 1, as well as for the opened position according to FIG. 2, in which a conduit part which is brought into connection with the conduit 15 by way of the hose connector 30 and the conduit 16 along the flat 22 of the plug 13 is also provided with a double sealing against the atmosphere. If the control device according to FIG. 1 is closed, the conduit 16 is closed by the packing ring 27 only and therefore it is to be recommended in a pressurized conduit system, to connect the pressure source to the conduit 15. Similarly, in a conduit system working at a reduced pressure it is to be recommended to connect the lowest pressure to the conduit 15. Here, the semi-spherical plug 13 has the advantage of being pressed more firmly into its cavity 12 by the atmospheric pressure.

As the cavity is semi-spherical and the packing rings have cooperating with it, pure tangent circles, the fabrication of the cavity as well as of the plug is quite simple. The plug 13 need not be a very precise fit, although this is always desirable; neither does the provision of the grooves 24 and 26 demand any excessive requirements. In case of wear, a closer fixation of the cap screw 21 and the disc 19 will suffice, and if necessary the addition of a shim under the bearing ring 28 to neutralize the clearance. In more serious cases, the O-rings may be replaced, but to do this the control device need not be removed. Only the cap 21 need be unscrewed and plug 13 should be taken out and provided with new O-rings.

A rough handling of the control device caused by the wrenching of the plug with the arm 20 has no perceptible influence on the packing ring, for all the rings touch on the sphere surface and the plug swings about the center line 14, the center of the sphere being the swinging center. The opening 18 about the stem of the plug can, therefore, be of ample dimension.

As indicated by dotted lines in FIG. 2, an additional duct 31 can be provided in the plug 13 and the stem 17 for the purpose of emptying conduit 16 when conduit 15 is in the closed position, which duct 31 can be connected to another conduit (not shown) by means of a hose connector 32.

Instead of a passage being formed by the flat 22 on plug 13, a passage way may be provided between conduits 15 and 16 in some different way, for example by a curved duct 35 through the plug 43 as in FIG. 3 or two bores interconnected inside of the plug 43 and opening opposite the apertures of conduits 15 and 16 when the control device is in the open position. The openings of duct 35 which open towards the cavity 12 should be located within the tangent circle formed by the O-ring 25 with the cavity 12 as well as inside of the groove 24. The conduit apertures may be of the sieve type as in FIG. 3 comprising a plurality of small holes 38 for controlling the capacity of flow.

The invention may also be incorporated in a dual or mixing type valve as shown in FIG. 4, where it will be seen that the body or casing 40 is provided with two semi-spherical cavities 12 each provided with a plug 13 of the type shown in FIG. 1. A hot water inlet duct 45 opens into one cavity 12 and a cold water inlet duct 46 opens in the other cavity 12, while outlet ducts 47 and 48 lead from the cavities to a common outlet conduit 50. Ducts 47 and 48 are eccentrically located with respect to the center lines of their respective cavities so that upon rotation of plugs 13 the passages between the inlet ducts and the outlet ducts may be opened or closed in the manner described in connection with FIGS. 1 and 2. In this connection it will be noted that the O-rings 25 on the plugs 13 are inclined in opposite directions when the valves are in their opened positions which produces an exceptionally compact mixing valve.

If desired, even a cavity smaller than a semi-sphere can be utilized, but then the plane of the tangent circle of the seal produced by the second packing ring 27 is no longer situated in the center of the sphere.

While there is described above the principles of this invention in connection with specific apparatus, it is to be clearly understood that this description is made only by way of example and not as a limitation to the scope of this invention.

What is claimed is:

1. A fluid flow control valve comprising:
  (A) a casing having a chamber fully opened at one side, and having at the utmost a semi-spherical concave seat opposite said open side with at least two duct openings opening into said seat, at least one of said openings being substantially aligned with the axis of said concave seat and said other openings being offset from said one opening at an angle to said axis,
  (B) a plug means rotatable about said axis in said chamber adjacent said seat and having duct means connectable between said one and at least one of said other duct openings, and having a circular groove means in said plug surrounding said duct means and located completely within said concave seat with the plane of said groove means at an angle to said axis,
  (C) first gasket means in said groove means for sealing duct means against said concave seat,
  (D) second gasket means surrounding said plug means adjacent said open side of said chamber for seating in said chamber,
  (E) means for holding said plug means in said chamber and for causing said plug both to urge said first gasket means axially of said chamber against said concave seat, and to maintain said second gasket means against the sides of said chamber adjacent said open side thereof, and
  (F) means for rotating said plug means in said chamber whereby said duct means in said plug means opens and closes said duct openings in said chamber.

2. A valve according to claim 1 wherein said casing comprises two chambers, and wherein one of said duct openings opening into each of said chambers has a common duct in said casing.

3. A valve according to claim 1 wherein said concave seat in said chamber is semi-spherical.

4. A valve according to claim 1 wherein said plug means is semi-spherical.

5. A valve according to claim 1 wherein said concave seat in said casing is semi-spherical and said plug means is also semi-spherical with a slightly less radius of curvature than that of said concave seat.

6. A valve according to claim 1 wherein said plug means includes a second circular groove means for said second gasket means, said second groove means being perpendicular to said axis and adjacent said open side of said chamber.

7. A valve according to claim 1 wherein said holding means comprises a cap having an aperture therein, and said means for rotating said plug means extends through said aperture.

8. A valve according to claim 1 wherein said gasket means comprise O-rings.

9. A valve according to claim 1 wherein one of said duct openings includes a flow reducing means.

10. A valve according to claim 1 wherein said means for rotating said plug means includes a manual lever.

11. A valve according to claim 1 wherein said axial aligned one of said openings in said casing is an inlet duct, and is always sealed from said open side of said chamber in said casing by both said gasket means.

12. A valve according to claim 1 wherein said holding means includes a separate ring means engaging said plug means.

13. A fluid flow control valve comprising:
  (A) a casing having
    (a) at least one cavity the lower inner surface thereof forming at the utmost a semi-spherical concave seat,
    (b) a duct opening into said cavity substantially central of said concave seat, and
    (c) at least one duct opening into said seat of said cavity eccentric to the center line of said cavity;
  (B) a cap means releasably attached to said casing covering the fully opened side of said cavity, and having
    (a) an inner annular bearing surface, and
    (b) an aperture substantially coaxial to said cavity;
  (C) a plug means having
    (a) a convex surface, the radius of which is less than the radius of curvature of said concave seat,
    (b) an annular surface substantially normal to the axis of said cavity located adjacent the spherical center of said concave surface and for engagement with said inner annular surface of said cap means, and (c) a passageway for fluid between said duct openings;

(D) means for rotating said plug means in said cavity substantially coaxial therewith, said rotating means extending through said aperture in said cap means, (E) a first sealing means rotatable with said plug means seated on the convex surface of said plug means in a plane intersecting at an acute angle the axis of said plug means between said center of said convex surface and the apex of said convex surface of said plug means for surrounding the said passageway, and forming with said concave seat a true circular contact area with a diameter substantially less than the diameter of said concave seat, and (F) a second sealing means rotatable with said plug means seated adjacent the largest circumference of said cavity.

14. A valve according to claim 13 wherein said cavity is semi-spherical and wherein said concave surface of said plug means is semi-spherical.

15. A valve according to claim 13 wherein said means for seating said first sealing means on said concave surface of said plug means comprises a groove in said concave surface of said plug means.

16. A valve according to claim 14 wherein said first sealing means comprises an O-ring.

17. A valve according to claim 13 wherein said releasable cap means is threaded on said casing.

References Cited by the Examiner
UNITED STATES PATENTS

| 801,126 | 10/05 | Alexander | 251—309 XR |
| 1,469,421 | 10/23 | Lenz | 251—310 XR |
| 2,631,002 | 3/53 | Mueller | 251—310 |

FOREIGN PATENTS

| 98,087 | 5/24 | Austria. |
| 1,160,452 | 3/58 | France. |
| 1,211,080 | 10/59 | France. |

M. CARY NELSON, *Primary Examiner.*